Feb. 20, 1945.  C. S. ASH  2,369,768
DEMOUNTABLE TIRE TREAD
Filed June 30, 1942  4 Sheets-Sheet 1
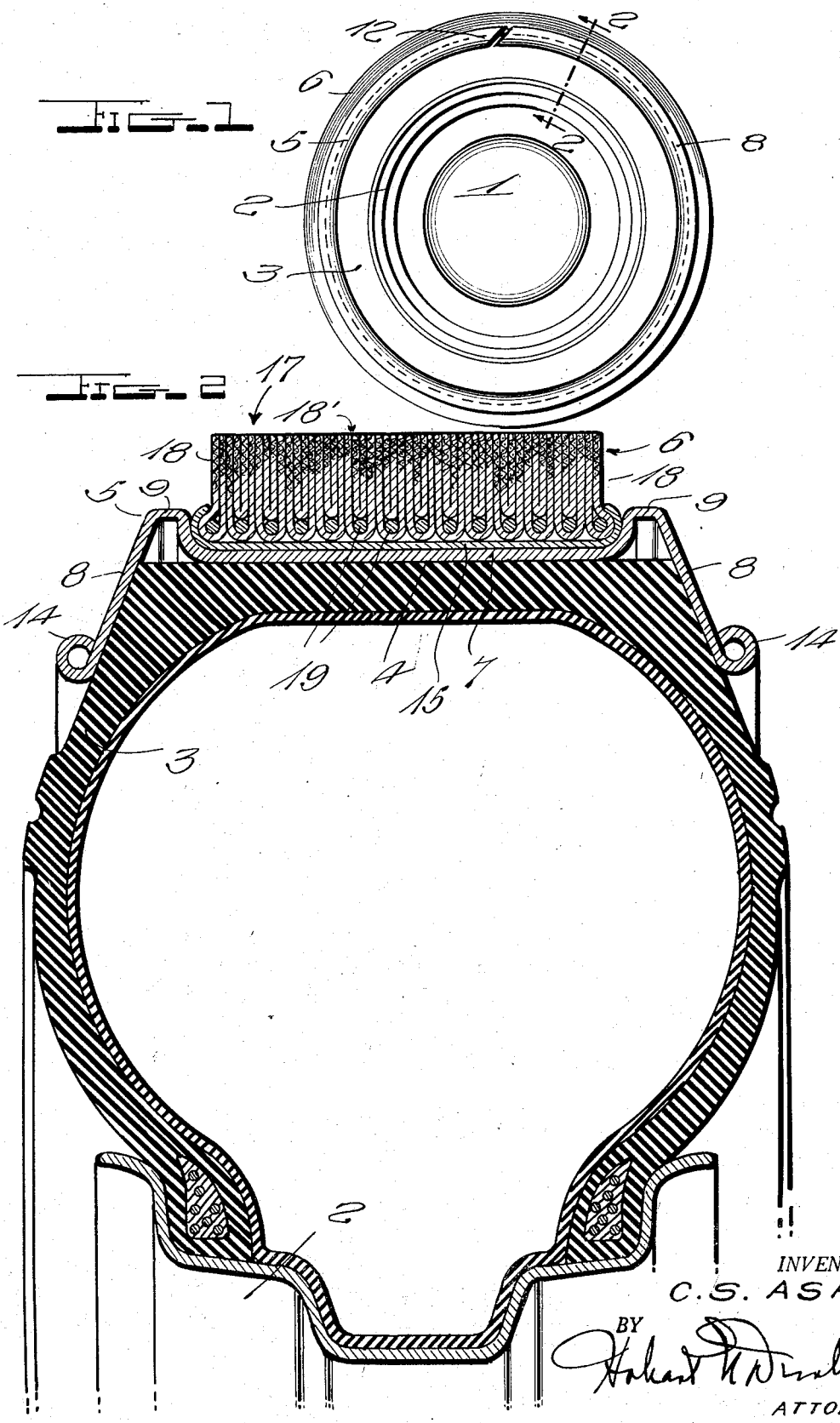
INVENTOR.
C. S. ASH,
BY
ATTORNEY Feb. 20, 1945.  C. S. ASH  2,369,768
DEMOUNTABLE TIRE TREAD
Filed June 30, 1942  4 Sheets-Sheet 2
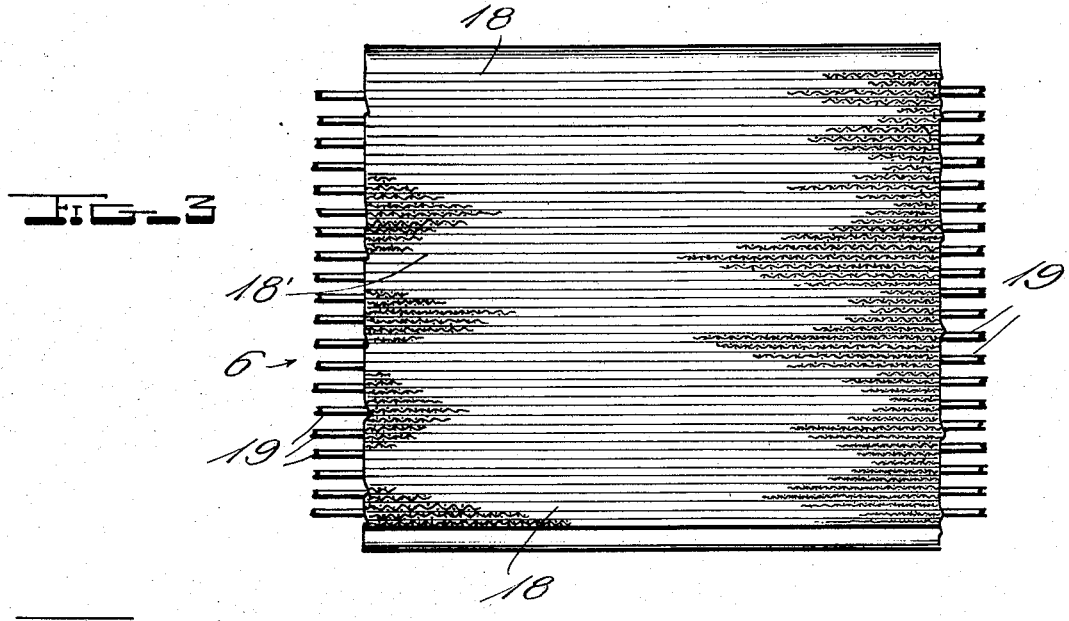
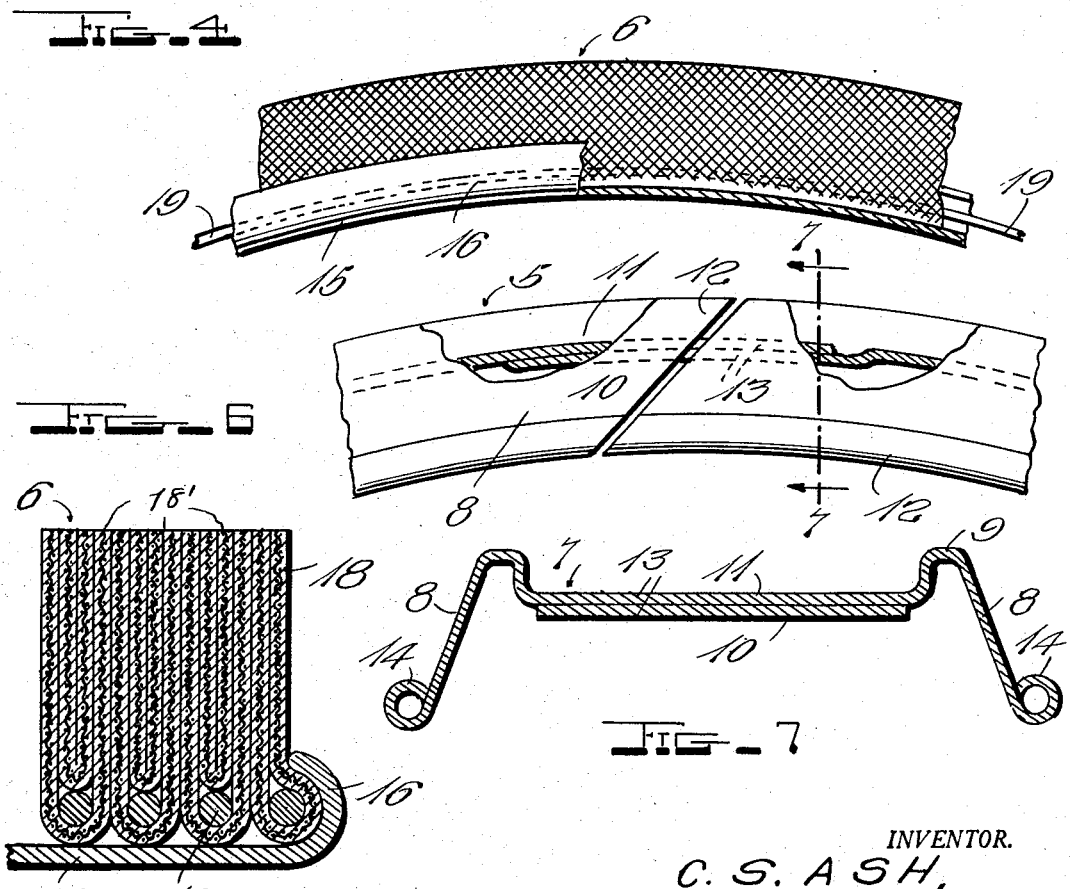
INVENTOR.
C. S. ASH,
BY
ATTORNEY

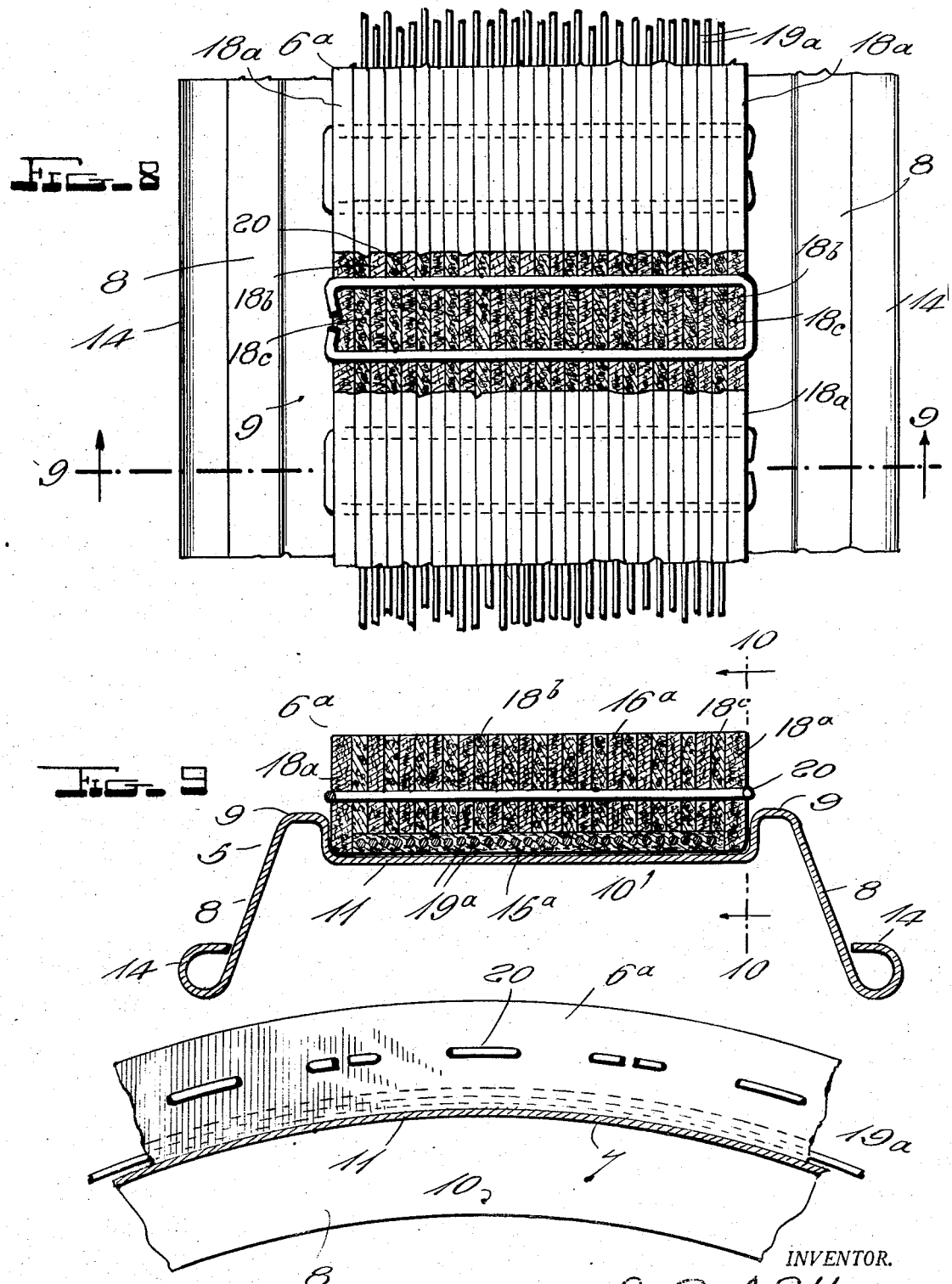

Feb. 20, 1945. C. S. ASH 2,369,768
DEMOUNTABLE TIRE TREAD
Filed June 30, 1942 4 Sheets-Sheet 4
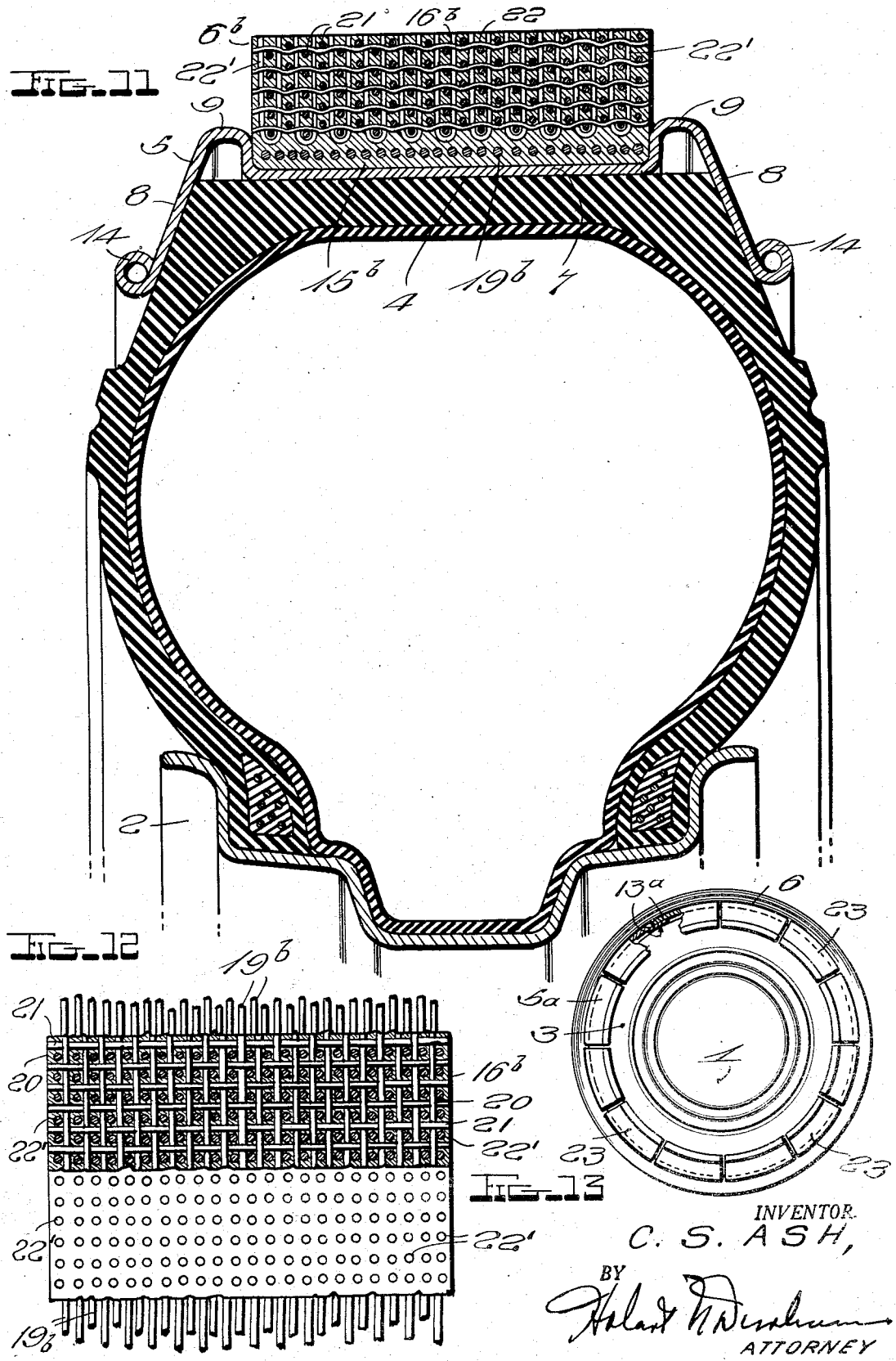

Patented Feb. 20, 1945

2,369,768

UNITED STATES PATENT OFFICE 2,369,768

DEMOUNTABLE TIRE TREAD

Charles S. Ash, Milford, Mich.

Application June 30, 1942, Serial No. 449,042

2 Claims. (Cl. 152—175)

This invention relates to a replaceable tread attachment for pneumatic wheel tires.

One object of the invention is to provide a replaceable tread attachment for pneumatic tires having worn down treads whereby an efficient type of substitute or supplemental tread for safe driving may be applied to a used tire whose tread is worn down to a dangerous degree so that such a tire may be utilized and maintained in service without the necessity of recapping or retreading it.

Another object of the invention is to provide an attachment of this character including a durable type of demountable tread element which may be manufactured with the use of little or no rubber, and which when worn out may be replaced at a low cost.

Still another object of the invention is to provide a tread attachment of this character comprising a demountable rim element and a replaceable tread element which may be easily assembled or disassembled and applied to and removed from a tire by a serviceman or by a motorist of ordinary mechanical ability in a ready and convenient manner and without the necessity of using any special tool or tools or exerting any great amount of force on the rim or tire.

Still another object of the invention is to provide a replaceable tread element comprising an inextensible band formed of fibrous material or materials, reinforced or not by associated metallic wear elements, suitable for giving a desired degree of wear and cushioning effect, and cooperating with the tire to adequately cushion road shocks.

With these and other objects in view, which will appear in the course of the subjoined description, the invention consists of the features of construction, combination and arrangement of parts, hereinafter fully described and claimed, reference being had to the accompanying drawings, in which:

Fig. 1 is a side elevation of a vehicle wheel equipped with a pneumatic tire to which the invention is shown applied.

Fig. 2 is a cross section on an enlarged scale through the tire rim, tire and attachment.

Fig. 3 is a sectional plan view of a portion of the tread unit.

Fig. 4 is a view partly in side elevation and partly in longitudinal section of a portion of the tread unit.

Fig. 5 is a cross section on an enlarged scale through a portion of the tread unit.

Fig. 6 is a fragmentary side elevation, partly broken away and in section, of the supplemental rim.

Fig. 7 is a cross section through the supplemental rim at its split point and showing the lapping rim ends.

Fig. 8 is a sectional plan view of a portion of the attachment, showing a modified construction of tread unit.

Fig. 9 is a cross section on the line 9—9 of Fig. 8.

Fig. 10 is a longitudinal section through the structure shown in Figs. 8 and 9, taken, for example, on line 10—10 of Fig. 9.

Fig. 11 is a view similar to Fig. 2, showing another modified construction of tread unit.

Fig. 12 is a sectional plan view of a portion of the tread unit shown in Fig. 11.

Fig. 13 is a view similar to Fig. 1, showing a modified construction of supplemental rim.

Referring more particularly to the drawings, and especially to Figs. 1 to 7, inclusive, I designates a vehicle wheel, 2 a tire holding rim mounted thereon, and 3 a pneumatic tire carried by the rim, all of which elements may be of conventional or any suitable construction. The tire shown is one of conventional type represented as having a tread surface 4 which has been worn down to a point at which it is no longer suitable for safe use, at least without recapping or retreading. This surface 4, if not sufficiently flat transversely, may be trimmed to a suitably flat state, to provide a good seat surface for the attachment. The side walls of this tire are provided with substantially straight flat faces 1ª, which are arranged at obtuse angles to the surface 4 and which are disposed outwardly beyond the points of maximum outward lateral bulge of said walls at the major transverse diameter point of the tire and extend convergently toward and intersect the lateral margins of the surface 4. My invention is designed to provide an attachment which may be applied to such a tire to furnish it with a substitute tread and to adapt it to be continued in service indefinitely as a main cushioning medium.

The attachment comprises a spring steel supplemental rim or guard band unit 5 and a substitute or supplemental tread unit 6, which are adapted to be mounted upon the tread portion of the tire and to take the place for service use of the worn away portion of the tread.

The rim unit 5 is in the form of a band shaped to surround and embrace the tread portion of the tire and of the cross section form shown in Fig. 2. The band comprises a body portion or tread plate 7 designed to bear flatly against the face of the tire tread 4 and having at its sides inwardly extending flanges 8 shaped conformably to and designed to bear against the sides of the tread 4. At the points of juncture of the plate 7 with the flanges 8 the band is offset in the reverse direction to the flanges 8 to form outwardly extending side flanges or beads 9. The formation of the band is thus such as to provide it with a channeled inner side 10 to adapt it to receive and embrace the tread portion and adjacent flat faces of the side walls of the tire beyond the point of major transverse diameter of the tire and to provide it with a channeled outer side 11 to receive the tread unit 6 which rests upon the plate 7 between the flanges 9 and is held from lateral displacement by these flanges. The band is split transversely at an oblique angle, as shown at 12, to permit of its diametric expansion and contraction to a desired degree, and the ends of the flanges 8 and 9 are cut away or set back from the free ends 13 of the plate 7 so formed and said ends 13 are arranged to form projections which overlap and to have sliding engagement in the expanding and contracting movements of the band. These ends 13 close the gap in the plate 7 at the point of the split to provide a continuous annular base support for the tread unit 6 when the units 5 and 6 are assembled for use and they are arranged so that they will be engaged by the tire and clamped thereby against each other and with the base plate 7 against the tread unit 6 by the pressure of the inflated tire. The free longitudinal edges 14 of the flanges 8 may be rolled, as shown, to provide stiffening reinforcements for the flanges and to avoid the presentation of plain edge surfaces liable to injure the tire.

The tread unit 6 comprises an inextensible cushioning band of a suitable diameter to adapt it to be applied to and removed from the rim 5 when the rim is contracted or collapsed and to adapt it when applied to grip and hold the rim in engagement with the tire and against expansion beyond a predetermined degree under tire pressure when the tire is inflated. The unit 6 shown in Figs. 1 to 6, inclusive, is made up of a metallic carrier ring or annulus 15 having hooked side edges 16, and a cushioning body 17. This body 17 is of laminated construction and consists of a suitable number of flat ring like outer and intermediate layers 18, 18' of cotton covered steel wire mesh fabric arranged vertically side by side in compact relation or closely compressed together. Each outer layer 18, as shown, is formed of a single strip of fabric folded in U-fashion upon itself, while each intermediate layer 18' is formed of a pair of such strips nested together or inclosed one within the other. The materials of these layers, as well as all the layers of the body, are suitably treated to render them waterproof and are firmly bound together by the use of a small amount of rubber or other suitable binder. The edge portions of the layers face outwardly to form the tread face of the body, while the bight portions of the layers face inwardly and form the seat base of the body which rests against the outer face of the ring 15. Arranged in the bight portions of the outer layers 18 and in the bight portions of the outer folds of the layers 18' at the base of the tread body are steel restrainer wire rings 19 which extend around the base of the body and stiffen it, and which are arranged in close relation parallel with each other in a row across the body to also serve the important function of rendering the body 17 uniformly inextensible from side to side thereof and of a fixed internal diameter and incapable of stretching. At their bases the thus reinforced outer layers 18 are engaged and interlocked with the hooked edges of the ring 15, by which the tread body and ring are securely held together. The tread unit constructed in this manner is adapted to fit about and in the channel of the rim 5 and presents a tread surface composed of closely compacted and commingled or interspersed portions of fabric and metal giving a high amount of durability and capacity for wear.

In the operation of mounting the attachment on a wheel, the band 6 is slipped over upon the rim 5 while the latter is held in a contracted or collapsed condition, and the assembled units 5 and 6 are then slipped from one side over upon the tread 4 of the tire 3 when the tire is in a deflated state. The diameters of these elements ar so chosen, in providing an attachment for a tire of given size, that when the rim 5 with applied tread band 6 is fitted upon a tire and the tire inflated to service pressure, the pressure of the tire will tend to place the rim 5 under expanding tension, which is restricted and not permitted beyond a certain degree by the inextensibility of the tightly fitting tread band 6, whereby the tire, supplemental rim and tread band will be tightly bound together against any possibility of relative slippage or casual displacement of the parts of the attachment. To remove the attachment from the tire it is only necessary to reverse this operation; i. e., deflate the tire, remove the assembled units 5 and 5, and then contract or collapse the unit 5 to release the unit 6, as will be readily understood. Owing to the simplicity of the structure and operations required, the work of applying or removing the attachment may be readily and quickly performed by a qualified serviceman or motorist having an ordinary degree of mechanical skill and knowledge of tires.

Due to the novel construction of my improved supplemental rim and tread units, the operations above described may be performed by a serviceman or motorist of ordinary mechanical ability by the use of ordinary conventional and readily available tools and without the use of any special form of tool or tools, since the construction of the rim and tread is such as to facilitate and render easy the assemblage and disassemblage of the units when removed from the pneumatic tire, and such as to adapt such units when assembled to be applied to and removed from a deflated tire without exerting any great amount of physical force either on the rim or on the tire in the engaging or disengaging actions.

It will be observed that the transversely flat rim base 7 is of less width than the width of the tread surface 4; that the inwardly extending flanges 8 are comparatively short and substantially straight or flat and are arranged at obtuse angles to the base 7, and that the outwardly extending flanges or beads 9 which connect the flanges 8 with the base 7 are of hollow or channeled formation or cross-sectionally of substantially frustoconical shape, the inner and outer walls of said flanges 9 being spaced and said inner walls extending outwardly at right angles from the base 7, while said outer walls extend inwardly at obtuse angles to the base in the planes of the flanges 8. It will also be observed that the return bends between said inner and outer walls of the flanges 9, and which form the outer walls of said flanges 8 and join the flanges 8 and 9 together, are curved on fairly wide arcs, thus allowing the flanges 8 to have a certain degree of lateral resiliency, while the inner walls of the flanges 9 are rendered comparatively stiff and resistant to lateral deflection as a result of the channeled formation of said flanges 9. The flanges 9 are of shallow depth and the inner walls thereof form with the base 7 a shallow channel to receive the tread unit 6, thus permitting of the use of a cushioned tread unit of some effective depth and which may project to an effective degree beyond the rim without objectionably increasing the over all diameter of the tire and its attachment. By this construction a rim of comparatively small channel-depth is provided which may be made of a minimum amount of metal and is of light weight, allowing it to be easily handled. When this rim is applied to the tire the flanges 8 resiliently bear upon the faces 1a with sufficient force to frictionally hold the rim in position against displacement or creeping on the inflated tire, while in the deflated condition of the tire the rim may be readily slipped onto or off the faces 1a with a minimum amount of labor and within a minimum period of time, without the necessity of exerting any considerable amount of force on the rim or tire or liability of causing injury to the tire. This advantage is gained as a result of the novel construction of the rim and by reason of the fact that the flanges 8 have bearing on the faces 1a only and do not project radially inward to a sufficient extent to hug or interlock with the side walls of the tire at its major transverse diameter point which would cause trouble and difficulty and require the use of a considerable amount of force in separating the rim from or applying it to the tire. When the attachment is in position the comparatively broad channeled flanges 9 overhang the lateral margins of the surface 4 lying beyond the rim base 7 and protect such margins of the tire tread and the lateral margins of the supplemental tread from coming into wiping contact with curbs or other extraneous surfaces and being abraded or otherwise injured thereby.

When the parts are assembled the rim 8 is held by the inextensible tread 6 from expansion under pressure of the tire and in a predetermined condition of contraction, so that by its expansive force it frictionally binds against the tread 6, and it is clamped between said tread and the tire tread 4 by the pressure of the tire, which is frictionally engaged by the plate 7 and flanges 8, whereby the rim is firmly held from outward displacement or creeping. This condition is maintained as long as the tire is under service pressure, since the tread 6 is held from side to side thereof uniformly against stretching by the row of reinforcing elements 19. The degree of contraction under which the rim is held by the tread 6 is not sufficient to cause its ends to abut, but sufficient to hold it under tension, a small gap being left between the ends to allow of a sufficient further contraction of the rim when the rim and tread are free from the tire, to permit removal of the tread from the rim. The rim is, of course, held fully contracted when the tread is applied thereto, to permit of such application, and is then permitted to expand to the predetermined degree permitted by the tread. The rim and tread thus mutually cooperate to effect a binding action therebetween with the rim held in the desired state of contraction.

In Figs. 8 to 10, inclusive, a modified construction of tread unit 6a is shown wherein a tread body base 15a of treated fabric is provided and wherein the tread unit body 16a is formed of outside layers 18a of treated fabric and intermediate layers 18b and 18c of treated fabric and compressed steel wool, the layers of treated fabric and steel wool alternating in arrangement with each other. The outer edges of these layers thus cooperatively form a tread face or traction surface of good traction and wear capacities. The restraining wires 19a, corresponding to the wires 19, which render the tread unit inextensible, are here shown as embedded in the body base 15a. To secure the layers of the tread unit together U-shaped steel staples 20 are employed which pass transversely through the layers and have the free ends of their arms clenched and arranged to bear against the sides of the unit, as shown. The body layers here used may also be bound together by rubber or any other equivalent kind of a binder.

Figs. 11 and 12 show another modified form of tread unit 6b in which the unit is formed of a base portion 15b and a body portion 16b consisting of a compressed body of cotton or other fibrous material united by woven warp and weft strands 21 and 22 of cord or steel wire and also interlaced or interwoven with U-shaped metallic wear elements 22', the free ends of the arms or tines of which extend to the tread surface, the whole being bound together by a suitable binding material. The base portion 15b has embedded therein the restraining wires 19b which render the unit inextensible. This unit fits like the units 6 and 6a in the rim channel 10 and is applied to and removed from the rim in the same manner. In this construction the wear elements 22' give a very high degree of wear capacity to the tread unit.

A rim band 5 of spring steel and having a single split 12 may be employed to secure simplicity of construction with a split arranged at an angle to facilitate collapsing. Collapsing may be effected by diametric contraction in the plane of the rim or by bending one end of the rim laterally out of alinement with the other, as will be readily understood. The overlapping rim ends 13 are used with this construction to prevent abnormal deflection of the rim due to the angle split 12. The rim as thus constructed, of course, will not allow the tire to flex individually on striking obstructions, but relies upon the cushioning action of the tire structure as a unit. I may, however, employ a type of supplemental rim, such as shown in Fig. 13, in which an expansible and collapsible rim 5a formed of a series of segments 23 is disclosed, said segments being separated by radial splits and the body plates of the sections having lapping end portions 13a operating similarly to the projections 13 to bridge the joints between the segments and form a continuous expansible and contractible cushioning supporting base for the tread unit. These rim segments or sections have relative motion in the running of the wheel to allow individual flexing of the tire for cushioning actions as well as cushioning movements of the tire structure as a whole. The mode of operation in applying and removing this type of rim will be evident from the foregoing description.

The primary object of my invention is to provide a tread attachment which will allow an old pneumatic tire to be kept in use, notwithstanding the fact that its tread may be worn down to the fabric, and without the necessity of recapping or retreading it. This object is effectually accomplished by the invention which provides an attachment which may be furnished at low cost for the purpose and which permits of the convenient and economical replacement of a substitute tread when worn out by a new one.

Having thus described my invention, I claim:

1. An attachment for the tread portion of a pneumatic tire to support a demountable supplemental tread band thereon, comprising an expansible and contractible demountable rim having a transversely flat base portion, comparatively short side flanges projecting radially inward on straight lines beyond the inner face of the base portion and laterally outward in converging relation to each other and at an obtuse angle to and terminating at their outer margins beyond the adjacent lateral margins of the base portion, and channeled intermediate portions projecting outwardly beyond the outer face of the base portion and having inner walls arranged perpendicularly to the plane of and connected to the base portion and having outer walls conforming in inclination to and connected to the outer margins of the side flanges, the walls of each channel portion being spread to definitely space the adjacent side flange from and resiliently connect the same with the adjacent lateral margin of the base portion, and said base portion and the inner walls of the channeled portions forming a comparatively shallow tread band receiving channel.

2. An attachment for the tread portion of a pneumatic tire to support a demountable supplemental tread band thereon, comprising a split annular, resilient and expansible and contractible demountable rim having a transversely flat base portion, projections at the ends of the base portion arranged to overlap and bridge the gap between said ends of the base portion, substantially straight comparatively short side flanges resiliently connected at their outer margins to the lateral margins of the base portion and projecting radially inward beyond the inner face of the base portion and laterally outward in converging relation to each other and at an obtuse angle to and terminating at their outer margins beyond the adjacent lateral margin of the base portion, and channeled intermediate portions projecting outwardly beyond the outer face of the base portion and having inner walls arranged perpendicularly to the plane of and connected to the base portion and having outer walls conforming in inclination to and connected to the outer margins of the side flanges, the walls of each channel portion being spread to definitely space the adjacent side flange from and resiliently connect the same with the adjacent lateral margin of the base portion, and said base portion and the inner walls of the channeled portions forming a comparatively shallow tread band receiving channel.

CHARLES S. ASH.